United States Patent [19]

Person et al.

[11] Patent Number: 5,267,525
[45] Date of Patent: Dec. 7, 1993

[54] REFLECTOR DEVICE

[76] Inventors: Mark N. Person; Beth Ann Ruland, both of 325 Emmett Ave., Bowling Green, Ky. 42101

[21] Appl. No.: 877,714

[22] Filed: May 4, 1992

[51] Int. Cl.⁵ .......................... B60Q 1/26; B62J 6/20; A63H 33/40
[52] U.S. Cl. .................. 116/202; 116/28 R; 359/525; 446/218
[58] Field of Search .......... 40/591, 592, 602; 73/189; 116/28 R, 174, 175, 202, 209, 264, 265; 359/520, 522, 525, 553; 446/201, 217, 218

[56] References Cited

U.S. PATENT DOCUMENTS

| | | | |
|---|---|---|---|
| 1,380,325 | 5/1921 | Schlirf | 446/218 |
| 1,798,052 | 3/1931 | Additon | 359/525 |
| 2,781,017 | 2/1957 | Fuller et al. | 359/525 X |
| 3,541,855 | 11/1970 | Frenzen et al. | 73/189 X |
| 3,758,190 | 9/1973 | Douglas | 359/525 |

Primary Examiner—William A. Cuchlinski, Jr.
Assistant Examiner—W. Morris Worth

[57] ABSTRACT

A device for attracting the attention of an observer having first and second pairs of arms mounted on a body at different elevations and at right angles to each other with air scoops and light reflectors on each of the arms so that the motion of air relative to the device will produce flashes of light alternately in the planes of the first and second pairs of arms.

7 Claims, 2 Drawing Sheets

REFLECTOR DEVICE

This invention relates generally to reflective-type visual marker or display devices, and more particularly, to such devices which are moveable to produce a distinctive visual pattern.

BACKGROUND AND SUMMARY OF THE INVENTION

The moveable reflector-type marker or display devices of the prior art have provided a constant visual image. As a consequence, such prior devices lacked the ability to attract, or to sustain if initially attracted, the attention of a casual observer.

The present invention overcomes this and other deficiencies in the prior art and provides a visual marker or display device which appears to flash on and off and to do so at different locations, which flashes on and off at variable rates depending on its rotational speed, which may be simply and economically powered by the passing flow of air, which is especially suitable for use on a bicycle, and which is relatively easy and inexpensive to manufacture, package and distribute. These and other attributess of the present invention, and many of the attendant advantages thereof, will become more readily apparent from a perusal of the following description and the accompanying drawings, wherein:

DESCRIPTION OF PREFERRED EMBODIMENTS

Figure 1:
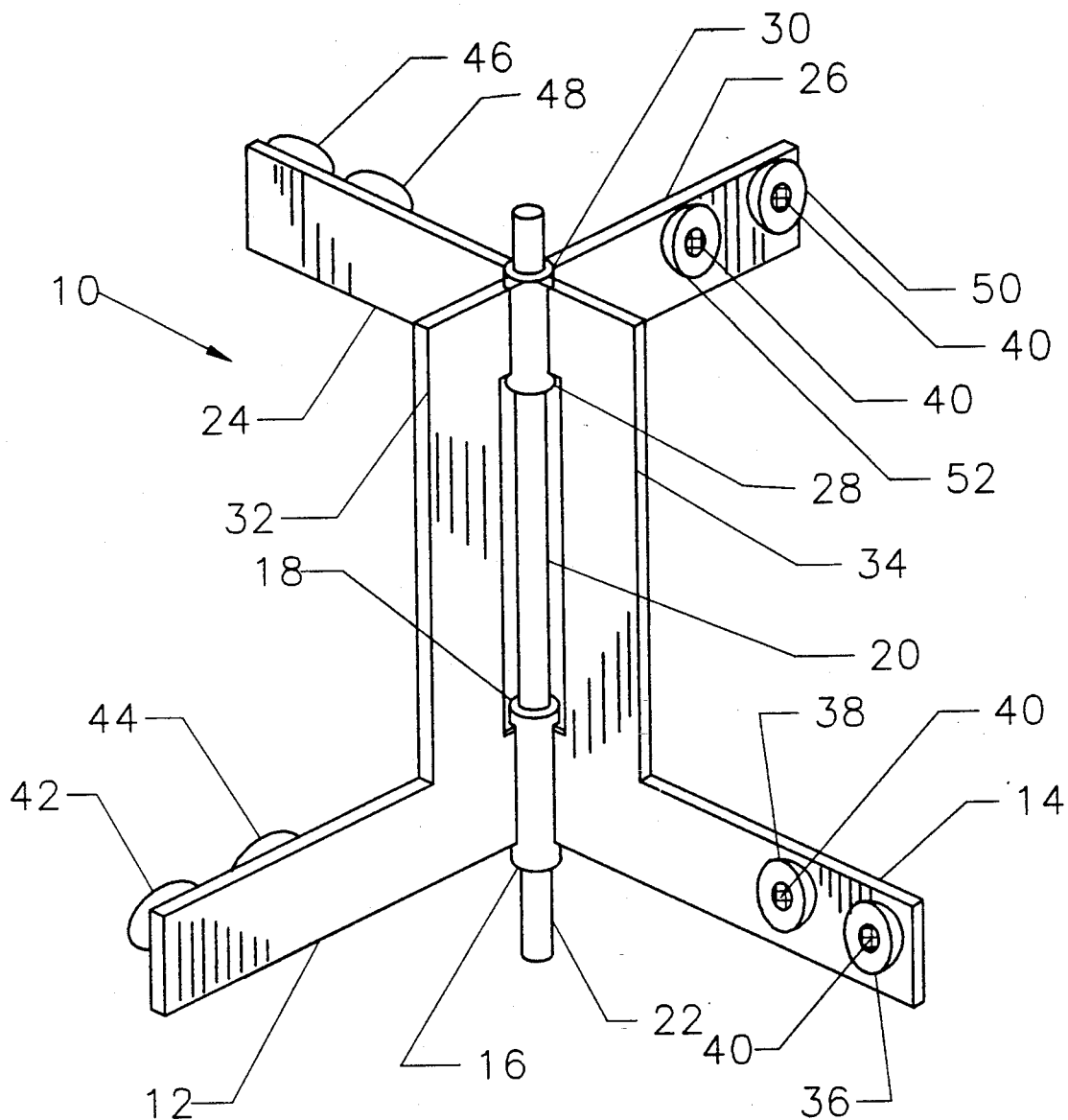
FIG. 1 is a pictorial representation of one embodiment of the present invention.

Referring now to FIG. 1, there is shown a device according to the present invention, indicated generally at 10, having a pair of lower arms 12 and 14 secured to a lower tube 16 and arranged at right angles to each other. A bushing 18 is retained in the lower tube 16 and rotatably engages a vertical support post 20, which has a larger diameter lower portion 22 forming an outward-extending shoulder to position and support the tube 16 vertically. Similarly, a pair of upper arms 24 and 26 are secured to an upper tube 28 with a bushing 30 retained therein for rotationally engaging the post 20. The upper arms 24 and 26 are arranged at right angles to each other, with the arms 24 and 26 oriented at 180 degrees from the arms 14 and 12 respectively. The position of the upper arms 24 and 26 relative to the arms 12 and 14 is maintained, and the upper tube 28 is supported by vertical members 32 and 34 which extend from and are secured to the lower arms 12 and 14 respectively and are secured at their upper ends to the upper tube 28.

A pair of hemispherical or cup-shaped air scoops 36 and 38 are attached to the lower arm 14. A disk 40 of material capable of reflecting light, such as standard automotive-type reflectors composed of multi-plane prisms, is secured near the bottom of each of the air scoops 36 and 38. A similar pair of air scoops 42 and 44 with reflector disks are secured to the lower arm 12 on the side thereof opposite the arm 14. The upper arms 24 and 26 are also provided with air scoops 46 and 48, and 50 and 52, respectively, with the scoops 46 and 48 positioned on the upper arm 24 on the side thereof opposite the side of the lower arm 14 on which the scoops 36 and 38 are secured, and the scoops on the arms 12 and 26 also being on opposite sides. With this relationship, the scoops always catch the air flowing past the device 10, regardless of the direction of that air flow, on one side of the post 20 creating a net force causing the device 10 to rotate on the post 20. The turning force is created because the air scoops are exposed to the air flow on one side of the post 20 while the smooth, plain side of the arms is exposed to the air flow on the other side of the post 20. Since the scoops catch the air and the smooth side of the arms do not, a greater force will be exerted on the scoop side than on the smooth side. The device 10 will therefore be rotated on the post 20.

As the device 10 rotates, the reflector disks 40 in the scoops 38 and 40 will be visible through approximately 90 degrees of rotation at the lower right of the device 10 to a viewer having a line of sight essentially at the elevation of the device. The reflector disks 40 in the scoops 42 and 44 on the lower arm 12 will then become visible at the lower right for essentially the same arc of the revolution. During the remaining portion of each revolution, the disks 40 on both arms 14 and 12 will be hidden from view. Thus, the disks on arms 14 and 12 will alternately appear to a viewer in succession followed by a period of time when no disks are visible. Since the human eye can distinguish images that occur at about 1/15 of a second or longer, the disks on the arms 14 and 12 may be individually distinguished at rotational speeds as high as 225 revolutions per minute (rpm). However, maximum visual effect is achieved when rotational speeds are in the range of 50 to 70 rpms.

Since the upper arms 24 and 26 are 180 degrees out of phase with the arms 14 and 12, the disks on arms 24 and 26 will alternately be visible at the upper right of the post 20 during that period of time when the disks on the lower arms 14 and 14 are not visible. The disks on the upper and lower arms will, therefore, appear alternately. Thus, there will be two flashes of reflected light at one elevation followed by two flashes of reflected light at a different elevation. If the disks on the two arms at the same elevation are of different colors, the visual effect of the two flashes at that elevation will be enhanced.

Figure 2:
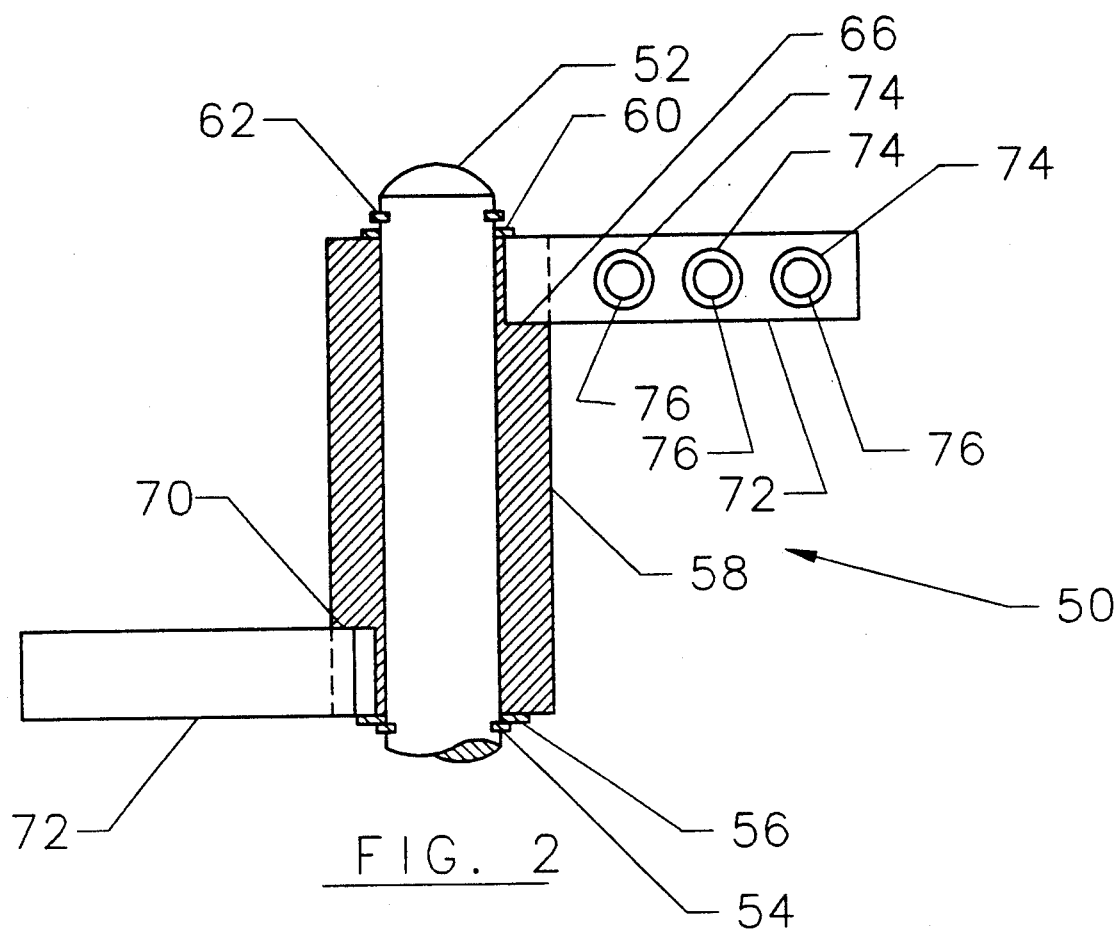
FIG. 2 is a side elevational view, partly in section, of another embodiment of the present invention.
Figure 3:
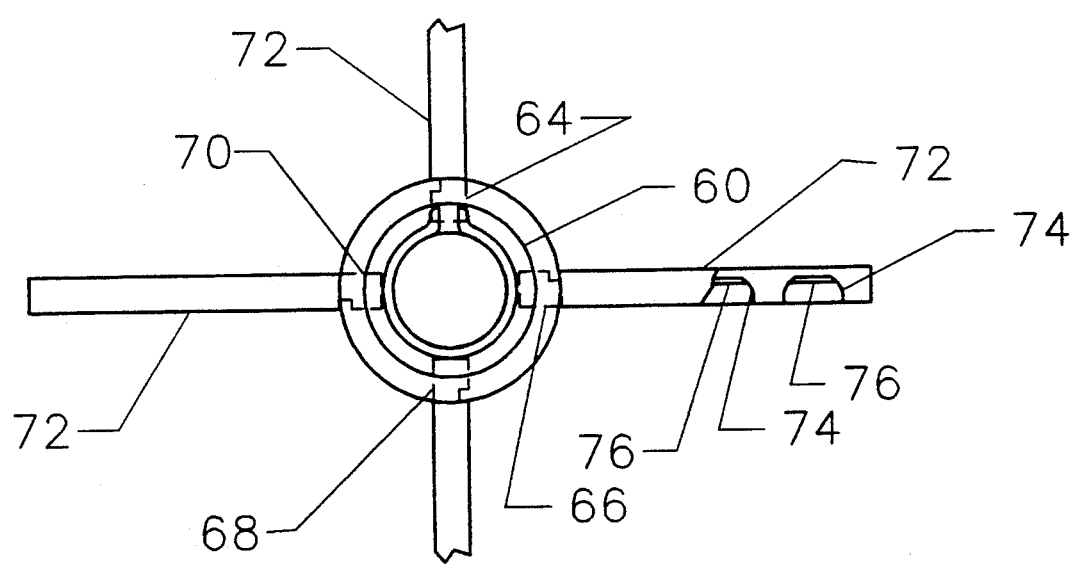
FIG. 3 is a top plan view, also partly in section, of the embodiment shown in FIG. 2.

Referring to FIGS. 2 and 3, there is shown a device, indicated generally at 50, which is similar to that of FIG. 1, but which is suitable for packaging and mass distribution. The post 52 has a circumferential groove for accepting a snap ring 54, although it could have a larger diameter lower portion to form a shoulder in the same manner as the post in FIG. 1. A washer 56 is positioned atop the snap ring 54. A cylindrical body 58 having a central, longitudinal-extending bore for rotational mounting on the post 52 is supported by the washer 56. A washer 60 rests on top of the body 58 with a snap ring 62 seated in a groove in the post 52 retains the body 58 thereon. The distance between the snap rings 54 and 60 must be greater the combined length of body 58 and the thickness of the two washers 56 and 60 so that the body 58 may freely rotate. A pair of longitudinal peripheral slots 64 and 66 are provided in the body 58. These slots are positioned 90 degrees from each other and extend through the upper end of the body 58. A similar pair of slots 68 and 70 are positioned 180 degrees from the slots 64 and 66 respectively and extend through the bottom of the body 58. Each of the slots has an offset keyway extending in the same direction angularly to accept and radially retain the complementary shaped end of an arm 72. The arm 72 has a plurality of cup-shaped air scoops 74 formed therein with a reflective disk secured in the bottom of each scoop. Since the slots are identically shaped and are complementary to the end of the arm 72, the arms 72 are also identical, except perhaps for the color of the disk 76, to simplify the manufacture of the device 50. The device 50 may be packaged and distributed in a disassembled state, with the final assembly being done by the purchaser. This may be easily accomplished by sliding an arm 72 into each of the slots 64, 66, 68 and 70 in the body 58 and positioning the body on the post 52, with the snap ring 54 and washer 56 having previously been seated and positioned. The assembly is completed by positioning the washer 60 and then seating the snap ring 62. The washers 56 and 60 have an outer diameter sufficient to overlap the slots 64, 66, 68 and 70 and thus hold the arms in place.

While two embodiments of the present invention have been illustrated and described herein, it will be appreciated that various changes and modifications may be made therein without departing from the spirit of the invention as defined by the scope of the appended claims.

What is claimed is:

1. A device for attracting the attention of an observer comprising:
   a shaft;
   first and second pairs of arms;
   means for mounting said pairs of arms on said shaft for rotation relative thereto;
   said first pair of arms projecting away from said shaft to define a first quadrant;
   said second pair of arms axially spaced along said shaft from said first pair of arms and projecting away from said shaft to define a second quadrant diagonally opposite said first quadrant;
   means for causing said arms to rotate as a unit; and
   reflector means capable of reflecting light carried by each of the arms of said first and second pairs of arms,
   whereby flashes of light reflected from said reflector means are visible to an observer alternately in the plane of the first pair of arms and in the plane of the second pair of arms as the arms are rotated on said shaft.

2. The invention according to claim 1, wherein the reflector means carried by each of the arms of said first pair are of a different color.

3. The invention according to claim 2, wherein the reflector means carried by each of the arms of said second pair are of a different color.

4. The invention according to claim 1 wherein said means for causing said arms to rotate comprises air scoop means formed on each of said arms for catching air flowing past said device.

5. An attention attracting device comprising:
   a body rotatably supported for rotation about a vertical axis of a post;
   means for rotatably supporting said body on said post;
   a first pair of arms oriented at right angles to each other attached to said body at one elevation;
   a second pair of arms oriented at right angles to each other attached to said body at a second elevation;
   said pairs of arms being oriented 180 degrees from each other;
   each of said arms having means to catch air from a stream on one side thereof only; and
   reflector means capable of reflecting light carried by each of said arms.

6. The invention according to claim 5 wherein each of the arms of said second pair is oriented parallel to one of the arms of the first pair and perpendicular to the other arm of the first pair.

7. The invention according to claim 6 wherein said body has longitudinal grooves having an irregular cross-section and each of said arms has an end with a cross-section complementary to said irregular cross-section for attaching said arms to said body.

* * * * *